US010606287B2

(12) United States Patent
Mussot

(10) Patent No.: US 10,606,287 B2
(45) Date of Patent: Mar. 31, 2020

(54) COMPACT AND BALANCED REGULATOR FOR DELIVERING PRESSURIZED FLUID

(71) Applicant: AD VENTA, Loriol-sur-Drôme (FR)

(72) Inventor: Jean-Luc Mussot, Loriol sur Drome (FR)

(73) Assignee: AD VENTA, Bourg de Peage (FR)

( * ) Notice: Subject to any disclaimer, the term of this patent is extended or adjusted under 35 U.S.C. 154(b) by 29 days.

(21) Appl. No.: 15/735,540

(22) PCT Filed: Jun. 10, 2015

(86) PCT No.: PCT/FR2015/000117
§ 371 (c)(1),
(2) Date: Dec. 11, 2017

(87) PCT Pub. No.: WO2016/198752
PCT Pub. Date: Dec. 15, 2016

(65) Prior Publication Data
US 2018/0173252 A1    Jun. 21, 2018

(51) Int. Cl.
*G05D 16/10*    (2006.01)
*F17C 13/02*    (2006.01)
(52) U.S. Cl.
CPC .......... *G05D 16/10* (2013.01); *F17C 13/025* (2013.01); *F17C 2205/0329* (2013.01);
(Continued)
(58) Field of Classification Search
CPC ............ F17C 13/025; F17C 2205/0329; F17C 2205/0338; F17C 2205/0382;
(Continued)

(56) References Cited

U.S. PATENT DOCUMENTS 2,563,192 A * 8/1951 Scruggs ................. G05D 16/10
137/102
2,640,332 A * 6/1953 Keyes ........................ F25J 3/04
137/505.27
(Continued)

FOREIGN PATENT DOCUMENTS

GB        536796 A      5/1941
JP        S5958260 U    4/1984

OTHER PUBLICATIONS

International Search Report for PCT Patent App. No. PCT/FR2015/000117 (dated Mar. 8, 2016) with English language translation thereof.
(Continued)

Primary Examiner — William M McCalister
(74) Attorney, Agent, or Firm — Kenealy Vaidya LLP

(57) ABSTRACT

A compensated pressure regulator for fluid under pressure including a hollow body, at least one intake for a fluid at high pressure, at least one outlet for this fluid at low pressure, a mobile regulation piece which slides in a cylindrical bore, able to stop the intake of the fluid at high pressure, and such that it includes a piece of generally cylindrical form with two heads of which the two partial inner and opposing faces are of quasi-equal surface; these two partial inner faces, a part of a bore surrounding the piece in a seal-tight manner and a seal integral with this bore delimits a high-pressure chamber, and the piece with two heads and this bore being mobile in relation to one another, and the intake for the high-pressure fluid emerges laterally in this high-pressure chamber, which fluid transmits to the mobile regulation piece loads which are cancelled out.

8 Claims, 4 Drawing Sheets

(52) U.S. Cl.
CPC ............... *F17C 2205/0338* (2013.01); *F17C 2205/0382* (2013.01); *F17C 2205/0388* (2013.01); *F17C 2250/0626* (2013.01); *Y10T 137/781* (2015.04)

(58) Field of Classification Search
CPC ..... F17C 2205/0388; F17C 2205/0626; G05D 16/10; Y10T 137/781
USPC .................................................. 137/505.27
See application file for complete search history.

(56) References Cited

U.S. PATENT DOCUMENTS

| | | | | | |
|---|---|---|---|---|---|
| 2,688,975 | A | * | 9/1954 | Born | G05D 16/0655 137/464 |
| 2,982,294 | A | * | 5/1961 | Koutnik | G05D 16/166 137/116.5 |
| 3,605,800 | A | * | 9/1971 | Kichiro | G05D 16/10 137/505.18 |
| 3,777,777 | A | * | 12/1973 | Katchka | G05D 16/0672 137/454.6 |
| 4,368,872 | A | | 1/1983 | Machat | |
| 6,382,243 | B2 | * | 5/2002 | Hiddessen | G05D 16/107 137/505.18 |

OTHER PUBLICATIONS

Written Opinion for PCT Patent App. No. PCT/FR2015/000117 (dated Mar. 8, 2016).
Jun. 12, 2019 Notice of Reasons for Refusal issued in corresponding Japanese Patent Application No. JP2017564327 (with English Translation).

* cited by examiner

COMPACT AND BALANCED REGULATOR FOR DELIVERING PRESSURIZED FLUID

CROSS REFERENCE TO RELATED APPLICATION(S)

This application is a national phase filing under 35 C.F.R. § 371 of and claims priority to PCT Patent Application No. PCT/FR2015/000117, filed on Jun. 10, 2015, the contents of each of which are hereby incorporated in its entirety by reference.

BACKGROUND

Some embodiments are directed to a compensated and compact pressure regulator for the distribution of fluid under pressure and a tank head incorporating the pressure regulator.

The technical sector of some embodiments is the field of the production and the use of expansion devices for fluid under pressure, such as gases, in which the aim is for the delivery of the fluid under pressure expanded to a determined pressure to be independent of the pressure of the fluid under pressure at the inlet.

In order to produce the expansion of a fluid under pressure, from a first high pressure level to a second low pressure level, lower than the high pressure, it is in fact known to one of ordinary skill in the art to use expansion devices, more simply called pressure regulators.

Related art pressure regulators operate based on the equality of two forces exerted directly or indirectly, on either side of a mobile regulation piece such as a membrane or a piston, through, on the one hand, the fluid at the high pressure and at the low pressure, and on the other hand an element with expansion or compensation spring effect; thus, in the most commonplace case where the reference force of the spring element is exerted on the side opposite to that transmitted both by the fluid at the low pressure and at the high pressure, this fluid fills two chambers under two different pressures, separated by a partition provided with a duct in which slides a rod integral to the mobile regulation piece and including a valve which can close this duct in the direction from the high-pressure chamber to the low-pressure chamber. When the force transmitted both by the fluid at the low pressure and at the high pressure is weaker than the opposing one transmitted by the spring, the latter pushes the mobile regulation piece whose valve is situated on its rod then opens the intake for the fluid under high pressure: the latter will thus supply the chamber at the low pressure until the latter, by increasing, makes it possible to exert a force on the mobile regulation piece that is equal to, then greater than, the opposing force of the spring element; this greater force will push the mobile regulation piece until the intake for the fluid under high pressure is closed, and so on; the balance of the forces thus ensures the delivery of a fluid at a quasi-constant desired low pressure for a determined thrust value of the spring element, which can be adjustable.

However, in most of the related art pressure regulators, if the high pressure of the fluid to be expanded undergoes great variations, the corresponding force on the mobile regulation piece will change and the opening of the valve will no longer occur at the same moment, resulting in a variation of the low pressure of the expanded fluid through the valve and therefore a poor operation and efficiency, and disturbances in the user apparatus, which is situated downstream of the pressure regulator from which it directly receives the fluid at the low pressure.

Each pressure regulator thus has a "dynamic expansion curve" which is representative of this property which can therefore be very detrimental. To mitigate this drawback, several categories of related art pressure regulators have been developed with the objective, more or less well achieved, of delivering an outlet pressure independently of the inlet pressure when the latter can vary, such as:
   those with two stages,
   those, of conventional type, additionally having a "compensated" valve which cancels the influence of the high pressure but to the detriment of simplicity and the compactness of the pressure regulator, and
   those, the to be of inverted type, being designed in such a way that the high pressure, bearing circularly and on a surface at right angles to the direction of displacement, generates on the mobile regulation piece a quasi-zero force compared to those exerted both by the spring element which bears in the direction of opening of the valve and the opposing force exerted by the fluid at the low pressure on the surface of the mobile piece and which tends to close the valve, as described in the patent applications EP362166, FR2879721 and FR2050407.

SUMMARY

In all the above related art categories of pressure regulators which tend therefore to deliver an outlet pressure independently of the inlet pressure when the latter can vary, the solutions developed are however fairly complex, not always achieving the expected result and do not make it possible to produce a pressure regulator which is compact and simple to produce: so, the aim of some embodiments is to mitigate these major drawbacks both in terms of ease of production and of assembly, and therefore of cost, and in terms of the compactness of the product and of its reliability.

Some embodiments relate to a pressure regulator that is compensated, but in a novel and innovative manner, that is compact and simple to manufacture, that is able to be mounted on any type of intake duct for fluid under pressure most directly linking a source of fluid at high pressure to a user apparatus operating at a low pressure, or directly between the source and the user apparatus, or even directly on a tank of which it then constitutes the distribution head, and which makes it possible to distribute, reliably, a low outlet pressure that is constant independently of the inlet pressure when the latter can vary, and also this low distribution pressure being able to be easily adjusted.

These advantages are addressed or achieved through a compensated pressure regulator for fluid under pressure including, as is in the related art, a hollow body, at least one intake for a fluid at high pressure, at least one outlet for this fluid at low pressure from a downstream expansion chamber, a mobile regulation piece which slides in a cylindrical bore of the hollow body and which forms a piston, on which bear on one side the low pressure and on the other side a expansion spring element, and which is able to stop the intake of the fluid under high pressure.

The pressure regulator includes a piece of generally cylindrical form, possibly of revolution, with two heads, separated and linked by a cylindrical part of smaller section forming a rod, and of which the two partial inner and opposing faces are of quasi-equal surface, and these two partial inner faces, a part of a bore surrounding the piece in a seal-tight manner and a seal integral with this bore delimiting a high-pressure chamber, and the piece with two heads and this bore being mobile in relation to one another.

The intake for the high-pressure fluid emerges laterally in the high-pressure chamber, which fluid then transmitting to the mobile regulation piece loads which cancel each other, the displacement of the mobile regulation piece is not modified by variations of the high pressure.

The mobile regulation piece stops the intake of the high-pressure fluid and isolates, in a seal-tight manner, the high-pressure chamber from the downstream expansion chamber by bearing on the tight seal of the head situated on the low-pressure side of the downstream expansion chamber when the pressure therein transmits a force greater than the opposing force imparted by the spring element on the mobile regulation piece.

Reciprocally, this mobile regulation piece opens the intake for the high-pressure fluid from the high-pressure chamber to the expansion chamber when the low pressure therein transmits a force less than the opposing force imparted by the spring element on the mobile regulation piece.

According to a first embodiment, the piece of generally cylindrical form with two heads is the mobile regulation piece on the outer faces of which respectively bear, on one, the expansion spring element and, on the other, the fluid at low pressure, and this piece slides in the bore integral with the hollow body.

According to a second embodiment, the piece of generally cylindrical form with two heads is fixed in relation to the hollow body and the mobile regulation piece is an independent second piece bearing the bore and the seal: this mobile regulation piece slides around the piece of generally cylindrical form with two heads and also itself slides in another bore of the hollow body.

The advantages are also addressed or achieved by a tank head, in which is stored a fluid under high pressure, including a pressure regulator as above, which is incorporated in the head whose body then corresponding to the body of the pressure regulator, is able to be fixed onto the neck of the tank, the intake orifice for this fluid at high pressure in the pressure regulator then being situated inside the tank and the outlet orifice then being situated outside the tank.

The result is a novel compensated pressure regulator for fluid under pressure as well as a novel tank head which meet the above advantages: in effect, the mobile regulation piece is not subjected to the effects of the high pressure, because, according to some embodiments, the latter is exerted on the one hand only at right angles at the displacement of this mobile piece and/or on the other hand on opposite and equal surfaces, of which the forces which are transmitted to them by the fluid under high pressure are therefore cancelled out. Such a pressure regulator is perfectly compensated and distributes, at the outlet, in a reliable manner, a constant low-pressure fluid independently of the value of the high inlet pressure even when the latter varies, and, in addition, this low distribution pressure can be easily adjustable as explained herein below.

Moreover, the arrangement of the pieces of which it is composed, and of which the main ones are all coaxial and can be nested and/or screwed into one another, allows for simple production and mounting and the pressure regulator obtained can be very compact as the examples descried herein below demonstrate.

Other advantages of some embodiments could be cited but those cited above already demonstrate enough to prove the novelty and the interest thereof.

The description below and the attached drawings represent four exemplary embodiments of the presently disclosed subject matter, but are in no way limiting; other embodiments are possible in the context of the scope and the extent of this the presently disclosed subject matter.

BRIEF DESCRIPTION OF THE DRAWINGS

Indeed, although the presently disclosed subject matter is described in relation to particular exemplary embodiments, it is obvious that it is in no way limited thereto but, on the contrary, open to modifications and variants which will become apparent to one of ordinary skill in the art and that it includes all or most the technical elements of the means described as well as their combinations provided that the latter fall within the scope of some embodiments.

DETAILED DESCRIPTION OF EXEMPLARY EMBODIMENTS

Figure 1:
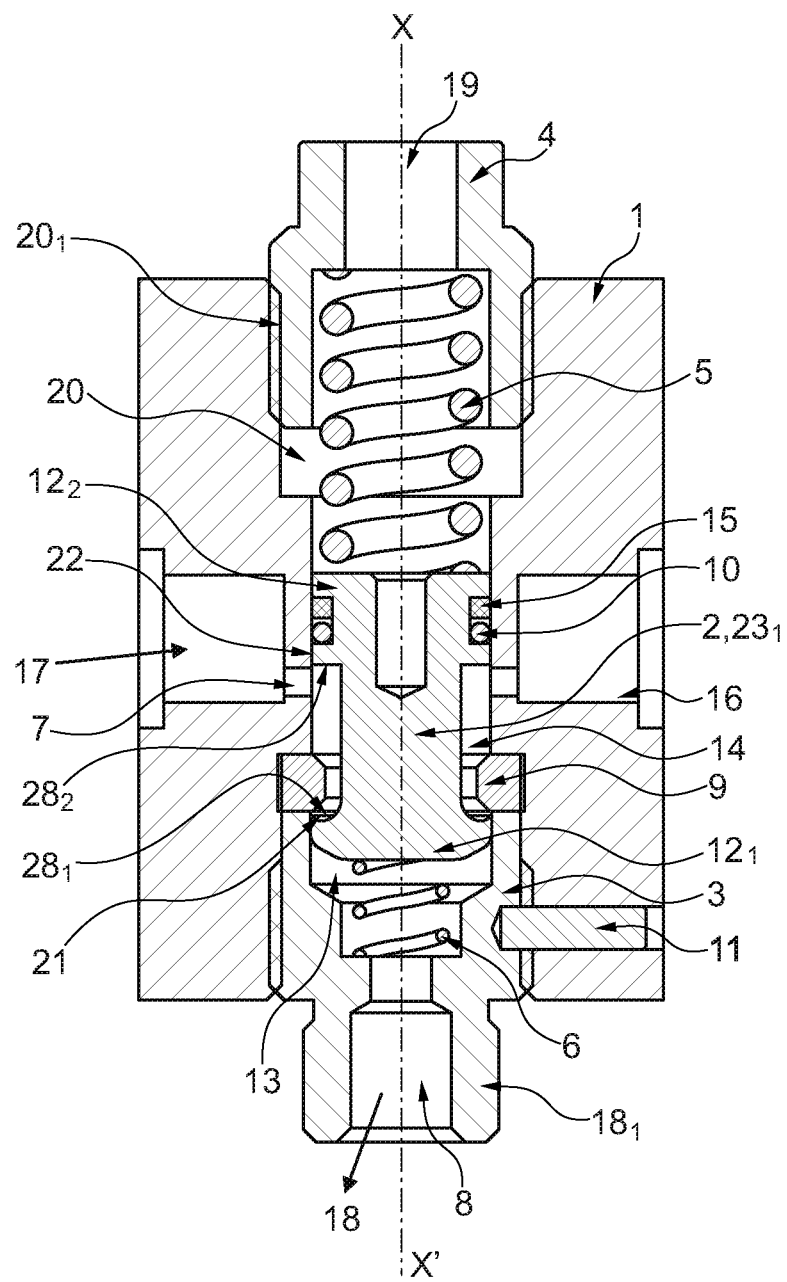
FIG. 1 is a view in axial cross section of a pressure regulator according to a first embodiment according to some embodiments with an adjustment of the low pressure by an expansion spring element bearing on a head of the piece of generally cylindrical form with two heads, which is also the mobile regulation piece, the contact surface of the head with the expansion spring having a surface equal to that corresponding to the downstream expansion chamber.

The pressure regulator according to some embodiments includes a substantially tubular cylindrical hollow body 1 of axis XX' and produced, in material compatible with and tight to the fluids under pressure, in several parts of which the main ones have the same axis XX', that can be nested and screwed together. The pressure regulator includes:

an intake 17 for a fluid under high pressure, at least one outlet 18 for this fluid under low pressure from a downstream expansion chamber 13, a mobile regulation piece 23 which slides in a cylindrical bore of the hollow body 1 and forms a piston: this mobile piece 23 is subjected, along the axis of this bore on one side and in one direction to the low pressure and on the other side and in an opposite direction to the force of a expansion spring element 5,20, a piece 2 of generally cylindrical form, possibly of revolution, with two heads 12 linked and separated by a cylindrical part of smaller section called a rod, of which the projections along the axis XX' of the two partial inner and opposite faces 28$_1$,28$_2$ are of quasi-equal surface; these two partial inner faces 28$_1$,28$_2$, a part of a bore 22 surrounding the piece 2 in a seal-tight manner and a seal 9 integral to this bore 22 delimit a high-pressure chamber 14 corresponding in fact to the free volume left by the red of the piece 2 with two heads; the latter and this bore 22 being mobile in relation to one another.

The intake 17 for the high-pressure fluid emerges laterally through one or more orifices 7 into this high-pressure chamber 14, which fluid transmits to the mobile regulation piece 23 loads that are either radial or along the axis XX' but which are cancelled out because they are exerted on equal and opposite surfaces of the faces $28_1, 28_2$, and the displacement of the mobile regulation piece 23 is not then modified by the variations of the high pressure.

The mobile piece 23 stops the intake 17 of the high-pressure fluid into the expansion chamber 13 when the low pressure in this chamber 13, by increasing because of this intake of fluid under high pressure, compensates, with the additional aid of a possible return spring 6, the opposing bearing force of the spring element 5,20: the increase in the low pressure thus pushes the mobile regulation piece 23 back until the intake of the fluid at high pressure is stopped and the high-pressure chamber 14 is isolated in a seal-tight manner from the downstream expansion chamber 13.

This stopping and this seal-tightness are obtained by bearing on the tight seal 9 of the head $12_1$ situated on the low-pressure side of the downstream expansion chamber 13 when the pressure therein transmits a force greater than the opposing force imparted by the spring element 5,20 on the mobile regulation piece 23; and, reciprocally, the latter opens the intake for the high-pressure fluid from the high-pressure chamber 14 to the expansion chamber 13 when the low pressure therein, decreasing, because of the fluid under pressure escaping from this expansion chamber 13 through the outlet 18, transmits a force less than the opposing force imparted by the spring element 5,20 on the mobile regulation piece 23: which spring element 5,20 once again, but in reverse direction, displaces this mobile piece 23 and allows this opening, and so on.

Figure 2:
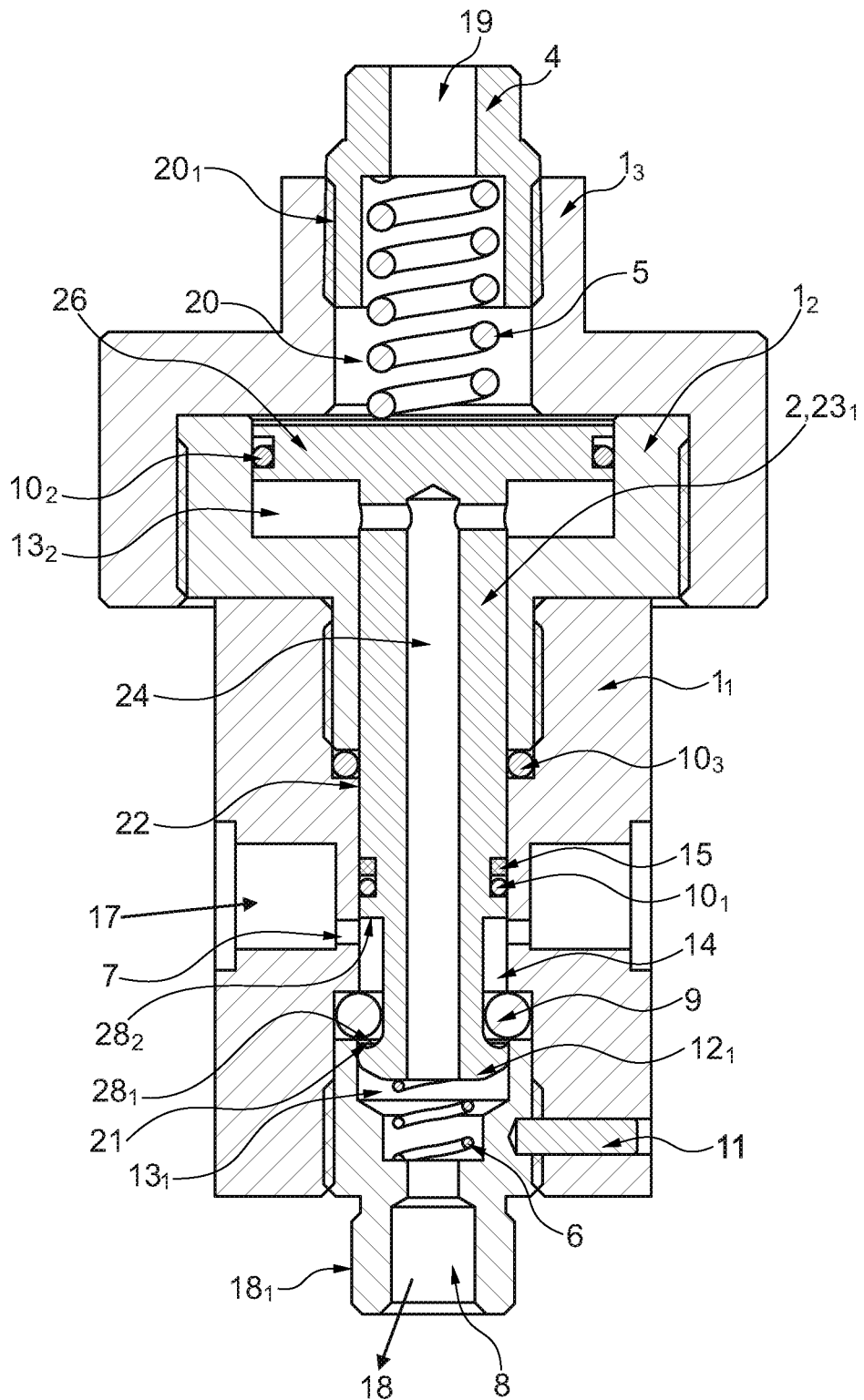
FIG. 2 is a view in axial cross section, as in FIG. 1, of a pressure regulator according to some embodiments with an adjustment of the low pressure by an expansion spring element bearing also on the same head of the mobile piece, but the contact surface of which is larger than that corresponding to the downstream expansion chamber and therefore scales down the adjustment sensitivity, which allows for a better control of the desired low pressure value whatever the inlet high pressure value.
Figure 4:
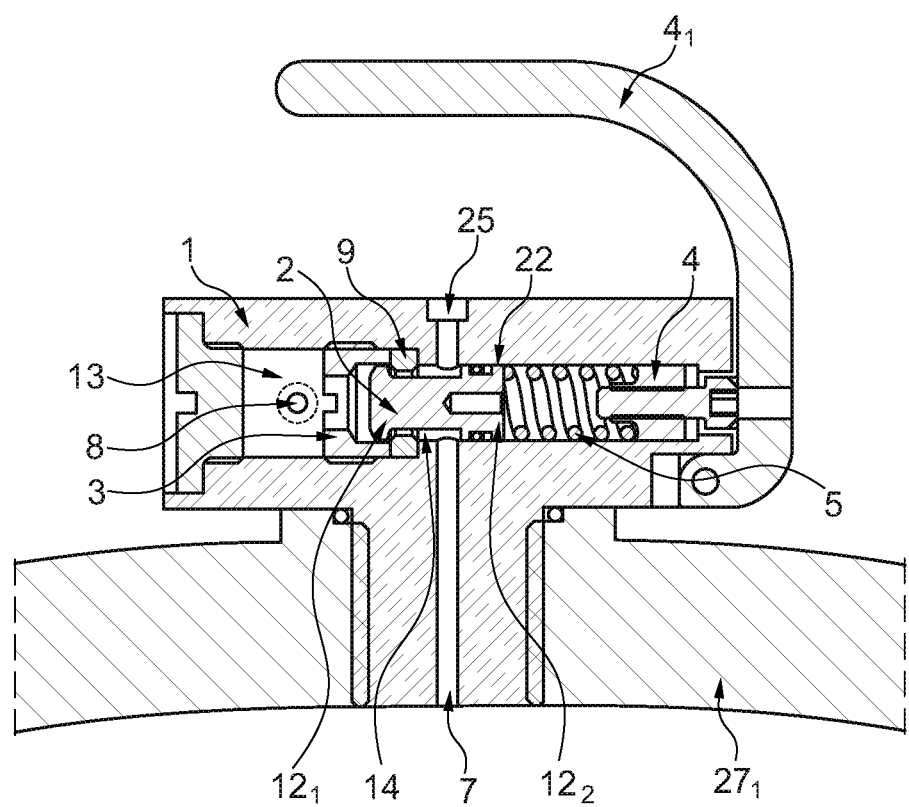
FIG. 4 is a view in axial cross section, as in the preceding figures, of a tank head containing a fluid at high pressure, which head incorporating a pressure regulator of the type of that represented in FIG. 1 with an outlet of the fluid under pressure at low pressure obviously situated on the outside of the tank and an emergency stop device.

According to the embodiments of FIGS. 1, 2 and 4, the piece 2 of generally cylindrical form with two heads 12 is also the mobile regulation piece $23_1$; on the outer faces of which respectively bear, on one, the expansion spring element 5,20 and, on the other, the fluid at low pressure, and this piece $2,23_1$ slides in the bore 22 integral to the hollow body 1.

This mobile piece $2,23_1$, of generally cylindrical form with two heads 12 linked by a rod, is a piston of which each head forms an end and on the outer faces of which bear, respectively, directly or indirectly:

for the first $12_2, 26$, the expansion spring element, which can be a spiral spring 5, or a fluid under pressure at a reference pressure situated in a sealed chamber 20, or even both a spring and a fluid under pressure, and for the second $12_1$, the fluid under pressure at low pressure, and possibly a return spring 6.

The first head $12_2$ of the mobile piece 2 slides, like an engine piston in its sleeve, in the bore 22 in a seal-tight manner by virtue of a peripheral O-ring seal $10_1$ and an anti-extrusion ring 15; the second head $12_1$ slides in a non-seal-tight manner in the downstream expansion chamber 13, which is in fact the extension of the bore 22 with a diameter which is possibly slightly greater.

The outer diameters of these two heads 12 are equal and the inner peripheral edge 21 of the second head $12_1$, that is to say situated facing the first head $12_2$ in the direction of the axis XX', comes to bear in a seal-tight manner against the flat and thick, or O-ring, seal 9: this seal 9, arranged between the low-pressure chamber 13 and the high-pressure chamber 14, is held in place between a shoulder produced at the end of the bore 22 and the end of a bottom piece 3.

This bottom piece 3 is screwed, and blocked in the desired position by a lateral needle 11, in a bore produced according to a diameter greater than that 22, in which the mobile piece 2 slides and along the same axis XX'. This bottom piece 3 is hollow with a part, of diameter greater than that of the head $12_1$, forming the expansion chamber 13 and containing the return spring 6, and another part, outwardly open according to the mode of representation of FIGS. 1 and 2, constituting the low-pressure outlet orifice 18, whereas its outer part surrounding this outlet 18 constitutes a connection end-fitting $18_1$.

This low-pressure outlet 8 is represented in FIGS. 1 and 2 in the axis XX' of the pressure regulator and oriented downward in the direction given by these figures (but which could be upward if the latter were represented in the other direction) but the open part of this bottom piece 3, and/or of the hollow body itself 1, can be closed as in FIG. 4 and the low-pressure outlet 8 can be situated laterally for example through the wall of the hollow body 1 of the pressure regulator by virtue of any connecting duct which links for that the low-pressure expansion chamber 13 and the outlet orifice.

The seal 9 has an outer diameter greater than that of the head $12_1$ and an inner diameter less than the latter but greater than that of the median part of narrower section, or rod, of the piston 2, which links the two the heads and delimits a part of the high-pressure chamber 14.

The inner peripheral edge 21 of the second head $12_1$ can be slightly curved inward to ensure the seal-tightness at its end against the seal 9 and better delimit, in this position, a surface of the partial inner face of this second head $12_1$, equal to the opposite one corresponding to the partial inner face of the first head $12_2$ delimited between the wall of the bore 22 and the rod of the piston 2.

According to FIG. 2, the end of the mobile regulation piece $23_1$ or piece 2 with two heads, which bearingly receives the spring element 5,20, forms a head 26 of greater section than those of the heads 12 delimiting the high-pressure chamber 14: a connecting duct 24 links a first downstream expansion chamber $13_1$, which receives the fluid from the high-pressure intake 17 when the mobile regulation piece 2 with two heads 12 opens the latter, and a second expansion chamber $13_2$ situated on the other side of the head 26 of large section of the mobile element 23.

This large section of surface of the head 26 then scales down the adjustment sensitivity, which allows for a better control of the desired low-pressure value regardless of the input high-pressure value.

Figure 3:
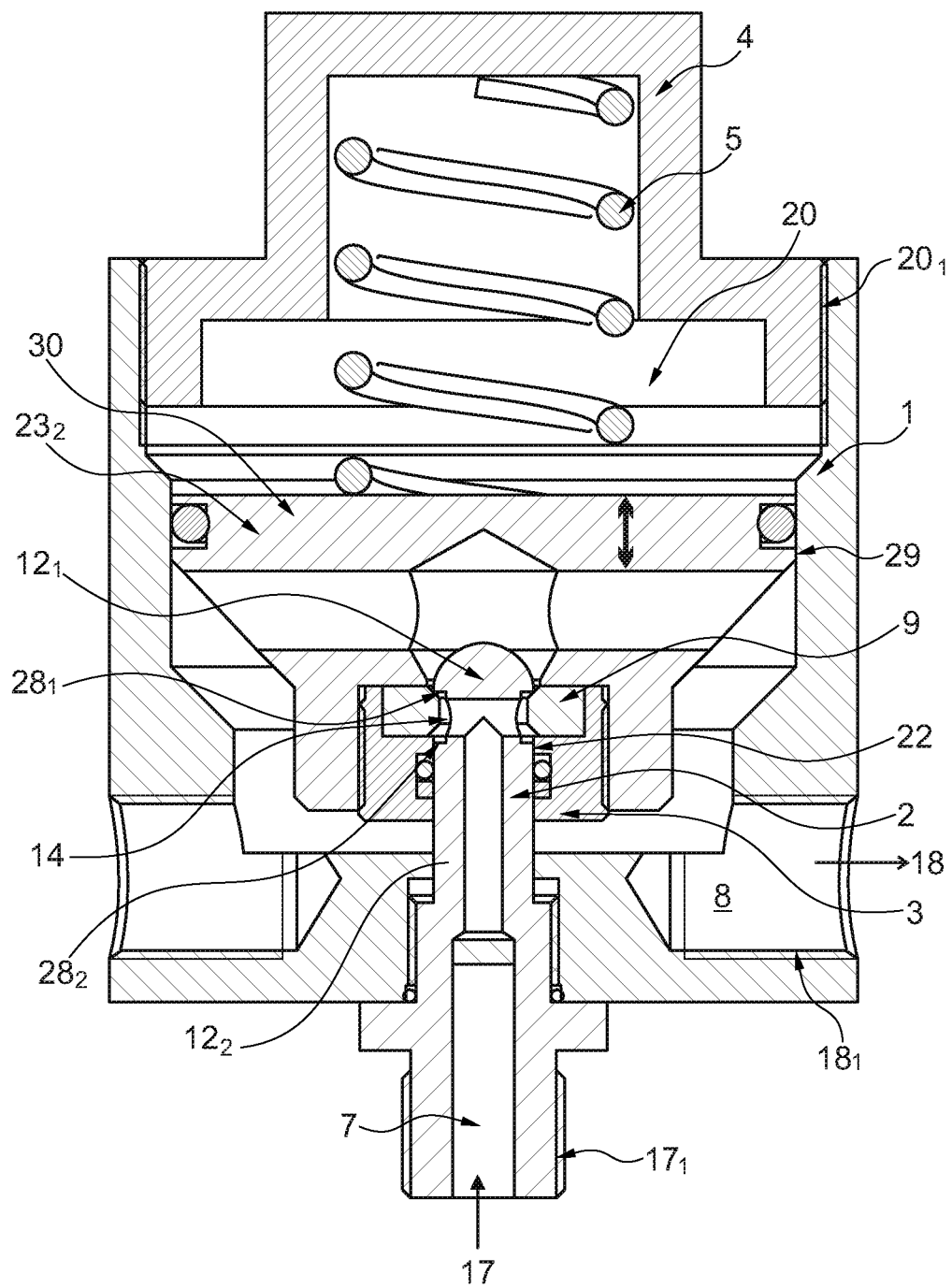
FIG. 3 is a view in axial cross section, as in FIGS. 1 and 2, of a pressure regulator according to a second embodiment according to some embodiments with an adjustment to the low pressure by an expansion spring bearing on a head of the mobile regulation piece which slides in relation to the piece of generally cylindrical form with two heads, which is fixed.

In the embodiment according to FIG. 3, the arrangement of the active elements is reversed: the piece 2 of generally cylindrical form with two heads 12 is fixed in relation to the hollow body 1 and the mobile regulation piece $23_2$ bears the bore 22 and the seal 9 which slide around the piece 2 of generally cylindrical form with two heads 12; and this mobile regulation piece $23_2$ itself slides in another bore 29 of the hollow body 1.

In this configuration, even if the piece 2 is fixed, because of its cylindrical form in which the high pressure arrives and that of the bore 22 which slides around it in a seal-tight manner, the effects of the high pressure are exerted only at right angles to the displacement of the mobile regulation piece $23_2$; and even if the bore 22 includes non-cylindrical surfaces like those of the seal 9, they are opposite and equal surfaces, like the inner ones 28 of the heads 12, and for which the forces which are transmitted to them by the fluid under high pressure are therefore cancelled out.

The principle of operation is the same as in the other embodiments of FIGS. 1 and 2, but with differences at the intake of the fluid at high pressure which arrives 7, 17 through the interior of the fixed piece with two heads 2 and emerges into the chamber 14 between the two heads 12 and it is the piece 3, which holds the seal 9, which ensures the seal-tightness around the head $12_2$ and is not connected with the expansion chamber 13. This expansion chamber 13 here surrounds the bottom part of the regulation piece $23_2$ and, as in FIG. 2, its head which bearingly receives the spring element 5,20 is of greater section than those of the heads 12 of the piece 2 delimiting the high-pressure chamber, which here also scales down the adjustment sensitivity and allows a better control of the desired low-pressure value regardless of the input high-pressure value.

In all or most the embodiments described above, the pressure regulator includes a device 4 for adjusting the thrust of the expansion spring element 5,20, which adjustment device 4 is coaxial to the movement of the mobile regulation piece $23_1,23_2$ and its adjustment determines the maximum compression force of the expansion spring element 5,20 in position of stopping of the intake 7 of the high-pressure fluid and therefore the low-pressure value.

According to the representation of FIGS. 1 and 2, the adjustment device 4 is a bolt screwed into the axis of the hollow body 1 inside a bore $20_1$ receiving a mechanical expansion spring 5 and drilled in the extension of that 22,29 in which the mobile regulation piece $23_1,23_2$ slides.

Whatever the embodiment, and in particular according to FIG. 3, the expansion spring element 5,20 and the adjustment device 4 are composed of a chamber 20 drilled in the extension of the bore 22,29 where the mobile regulation piece $23_1,23_2$ slides and in which a fluid, at given and adjustable reference pressure, maintains a bearing thrust on the surface of the head $12_2,26,30$ of the mobile regulation piece $23_1,23_2$ opposite to that on which the desired low pressure bears.

FIG. 4 represents a head of a tank 27 for storing a fluid under high pressure: this head includes a pressure regulator according to the embodiments described previously and more particularly according to the embodiment of FIG. 1; which pressure regulator is incorporated in the head whose body 1, corresponding to that 1 of the pressure regulator, is able to be fixed onto the neck of the wall $27_1$ of the tank 27.

The axis XX' of the pressure regulator is of a direction tangential to the wall $27_1$ of the tank, the intake orifice 7 for the high-pressure fluid then being situated inside the tank 27 and the outlet orifice 8 being situated outside the latter.

The pressure regulator or the tank head also includes a filling duct 25, which passes through the body 1 and which emerges in the high-pressure chamber 14: it is thus able to allow the tank 27 to be filled with the fluid under high pressure without the need for another passage through the shell in the tank head or the tank itself.

In an embodiment not represented here, the axis XX' of the pressure regulator is in the axis of the neck of the tank, a high-pressure duct then links the high-pressure chamber 14, both to the interior of the tank and to the outside for filling, and another low-pressure duct links the low-pressure chamber 13 to the outside.

The pressure regulator or the tank head includes an emergency stop device $4_1$ for the low-pressure fluid outlet; this device 4 is able to release the compression force of the expansion spring element 5,20, such as a handle $4_1$, articulated at its proximal end on the body 1 of the pressure regulator or tank head, and which, by pulling manually on its distal and bent-back free end displaces the adjustment device 4 which holds the spring element 5: the latter then no longer bears on the regulation piece 2 which thus remains in position of closure and the low-pressure outlet is no longer supplied.

The invention claimed is:

1. A compensated pressure regulator for use with fluid under pressure, comprising:
   a hollow body;
   at least one intake for the fluid under high pressure, at least one outlet for this fluid under low pressure from a downstream expansion chamber;
   a unitary mobile regulation piece which slides in a cylindrical bore of the hollow body, and which, forming a piston on which bear on one side the low pressure and on the other side an expansion spring element, is able to stop the intake of the fluid at high pressure;
   wherein the mobile regulation piece comprises a piece of generally cylindrical form with two heads of which the two partial inner and opposing faces are of equal surface, and these two partial inner faces, a part of the bore surrounding the piece in a seal-tight manner and a tight seal integral with this bore delimiting a high-pressure chamber, and the piece with two heads and this bore being mobile in relation to one another,
   wherein the intake for the high-pressure fluid emerges laterally in this high-pressure chamber, which fluid transmits to the mobile regulation piece loads which cancel each other, and the displacement of the mobile regulation piece is therefore not modified by the variations of the high pressure,
   wherein the mobile regulation piece stops the intake of the high-pressure fluid and isolates, in a seal-tight manner, the high-pressure chamber from the downstream expansion chamber by bearing on the tight seal of the head situated on the low-pressure side of the downstream expansion chamber when the pressure therein transmits a force greater than the opposing force imparted by the expansion spring element on the mobile regulation piece,
   wherein reciprocally, this mobile regulation piece opens the intake for the high-pressure fluid from the high-pressure chamber to the expansion chamber when the low pressure therein transmits a force less than the opposing force imparted by the expansion spring element on the mobile regulation piece,
   wherein the piece of generally cylindrical form with two heads is the mobile regulation piece on the outer faces of which respectively bear, on one, the expansion spring element and, on the other, the fluid at low pressure, and this piece slides in the bore integral with the hollow body, and
   wherein the end of the mobile regulation piece or piece with two heads, which bearingly receives the expansion spring element, forms a third head of larger cross section than those of the heads delimiting the high-pressure chamber; and
   a connecting duct between a first downstream expansion chamber, which receives the fluid from the high-pressure intake when the mobile regulation piece with two heads opens the latter, and a second expansion chamber situated on the other side of the third head of larger section of the mobile element.

2. The compensated pressure regulator for use with high-pressure fluid according to claim 1, further comprising:

a device for adjusting the thrust of the expansion spring element, which adjustment device is coaxial to the movement of the mobile regulation piece and its adjustment determines the maximum compression force of the expansion spring element in the position of stoppage of the intake for the high-pressure fluid and therefore the value of the low pressure.

3. The compensated pressure regulator for use with fluid under pressure according to claim 2, wherein the adjustment device is a bolt screwed into the axis of the hollow body inside a bore receiving the expansion spring element and drilled in an extension thereof in which the mobile regulation piece slides.

4. The compensated pressure regulator for use with fluid under pressure according to claim 2, wherein the expansion spring element and the adjustment device consist of a chamber drilled in an extension of the bore where the mobile regulation piece slides and in which a fluid, at given and adjustable reference pressure, maintains a bearing thrust on the surface of the third head of larger section of the mobile regulation piece opposite that on which the desired low pressure bears.

5. A tank head, comprising:

a tank having a neck; and the pressure regulator according to claim 1, which pressure regulator is incorporated in the head whose body, corresponding to the body of the pressure regulator, is able to be fixed onto the neck of the tank for storing a fluid under pressure, the intake orifice for the high-pressure fluid being then situated inside the tank and the outlet orifice being then situated outside the tank.

6. The tank head according to claim 5, further comprising a filling duct, which passes through the body and which is able to allow the filling of the tank with the fluid under high pressure.

7. The tank head according to claim 5, further comprising an emergency stop device able to release the compression force of the expansion spring element.

8. The tank head according to claim 6, further comprising an emergency stop device able to release the compression force of the expansion spring element.

* * * * *